US012724965B2

(12) United States Patent
Shen et al.

(10) Patent No.: US 12,724,965 B2
(45) Date of Patent: Sep. 1, 2026

(54) RELIABLE GRADIENT-FREE AND LIKELIHOOD-FREE PROMPT TUNING

(71) Applicants: International Business Machines Corporation, Armonk, NY (US); Massachusetts Institute of Technology, Cambridge, MA (US)

(72) Inventors: Maohao Shen, Cambridge, MA (US); Soumya Ghosh, Boston, MA (US); Prasanna Sattigeri, Acton, MA (US); Subhro Das, Cambridge, MA (US); Yuheng Bu, Philadelphia, PA (US); Gregory Wornell, Wellesley, MA (US)

(73) Assignees: INTERNATIONAL BUSINESS MACHINES CORPORATION, Armonk, NY (US); Massachusetts Institute of Technology, Cambridge, MA (US)

(*) Notice: Subject to any disclaimer, the term of this patent is extended or adjusted under 35 U.S.C. 154(b) by 365 days.

(21) Appl. No.: 18/510,612

(22) Filed: Nov. 15, 2023

(65) Prior Publication Data

US 2025/0156638 A1 May 15, 2025

(51) Int. Cl.
*G06F 40/284* (2020.01)

(52) U.S. Cl.
CPC .................................. *G06F 40/284* (2020.01)

(58) Field of Classification Search
CPC ............................... G06F 40/284; G06F 40/30
(Continued)

(56) References Cited

U.S. PATENT DOCUMENTS

2022/0237446 A1* 7/2022 Lei .......................... G06N 5/022
2023/0342559 A1* 10/2023 Bhardwaj ............. G06N 20/00
(Continued)

FOREIGN PATENT DOCUMENTS

CN 114661913 A 6/2022
CN 114997149 A 9/2022
(Continued)

OTHER PUBLICATIONS

Shen M, Ghosh S, Sattigeri P, Das S, Bu Y, Wornell G. Reliable gradient-free and likelihood-free prompt tuning. arXiv preprint arXiv:2305.00593. Apr. 30, 2023. 14 pages (Grace Period Disclosure).

(Continued)

*Primary Examiner* — Paras D Shah
*Assistant Examiner* — Fouzia Hye Solaiman
(74) *Attorney, Agent, or Firm* — Amin, Turocy & Watson, LLP

(57) ABSTRACT

Prompt embedding samples are drawn from a prior distribution and are passed into a pretrained model to receive a corresponding token label prediction for a batch of text data. Prompt embedding samples are accepted from a distribution of a first iteration; the accepted samples satisfy a condition of a distance function between a ground truth label and the corresponding token label prediction being less than a first tolerance. Embeddings are resampled from the accepted prompt embedding samples with probability proportional to weights and the resampled embeddings are perturbed via a perturbation kernel to obtain a new sample. The perturbed resampled embeddings are propagated through the pretrained model, and those that satisfy a condition are projected, where the second tolerance is decayed by one step per iteration. The projected resampled embeddings are con- (Continued)

catenated with an embedding of a given input and inferencing is performed.

15 Claims, 8 Drawing Sheets

(58) Field of Classification Search
USPC .............................................................. 704/9
See application file for complete search history.

(56) References Cited

U.S. PATENT DOCUMENTS

| | | | | |
|---|---|---|---|---|
| 2024/0005082 | A1* | 1/2024 | Yin | G06F 40/289 |
| 2024/0289550 | A1* | 8/2024 | Wu | G06N 3/045 |
| 2024/0311834 | A1* | 9/2024 | Perez | G06Q 20/383 |
| 2025/0124620 | A1* | 4/2025 | Arora | G06T 11/26 |

FOREIGN PATENT DOCUMENTS

| | | | |
|---|---|---|---|
| CN | 115204143 | A | 10/2022 |
| CN | 115292484 | A | 11/2022 |
| CN | 115311113 | A | 11/2022 |
| CN | 115345300 | A | 11/2022 |
| CN | 115423118 | A | 12/2022 |
| CN | 115618006 | A | 1/2023 |
| CN | 115795009 | A | 3/2023 |

OTHER PUBLICATIONS

Lester et al., “The power of scale for parameter-efficient prompt tuning”, https://arxiv.org/pdf/2104.08691, Sep. 2, 2021, 15 pages.
Liu et al., “P-Tuning v2: Prompt Tuning Can Be Comparable to Fine-tuning Universally Across Scales and Tasks”, https://arxiv.org/pdf/2110.07602, Mar. 20, 2022, 8 pages.
Shin et al., “AUTOPROMPT: Eliciting Knowledge from Language Models with Automatically Generated Prompts”, https://arxiv.org/pdf/2010.15980, Nov. 7, 2020, 15 pages.
Sun et al., “BBTv2: Pure Black-Box Optimization Can Be Comparable to Gradient Descent for Few-Shot Learning”, https://arxiv.org/pdf/2205.11200v1, May 23, 2022, 12 pages.
Sun et al., “Black-Box Tuning for Language-Model-as-a-Service”, https://arxiv.org/pdf/2201.03514, Jun. 27, 2022, 15 pages.

* cited by examiner

Left: *With model tuning, incoming data are routed to task-specific models.* Right: *With prompt tuning, examples and prompts from different tasks can flow through a single frozen model in large batches, better utilizing serving resources.*

Table 1

| Settings | Methods | Dataset #1 | Dataset #2 | Dataset #3 | Dataset #4 | Dataset #5 | Dataset #6 | Dataset #7 | Avg |
|---|---|---|---|---|---|---|---|---|---|
| Gradient-based | Prompt Tuning* | 68.23±3.78 | 61.02±6.65 | 84.81±0.66 | 87.75±1.48 | 51.61±8.67 | 36.13±1.51 | 54.69±3.79 | 63.46 |
| | P-Tuning v2* | 64.33±3.05 | 92.63±1.39 | 83.46±1.01 | 97.05±0.41 | 68.14±3.89 | 36.89±0.79 | 50.78±2.28 | 70.47 |
| | Model Tuning* | 85.39±2.84 | 91.82±0.79 | 86.36±1.85 | 97.98±0.14 | 77.35±5.70 | 54.64±5.29 | 58.60±6.21 | 78.88 |
| Gradient-free | Manual Prompt* | 79.82 | 89.65 | 76.96 | 41.33 | 67.40 | 31.11 | 51.62 | 62.56 |
| | In-Context Learning* | 79.79±3.06 | 85.38±3.92 | 62.21±13.46 | 34.83±7.59 | 45.81±6.67 | 47.11±0.63 | 60.36±1.56 | 59.36 |
| | Feature-MLP* | 64.80±1.78 | 79.20±2.26 | 70.77±0.67 | 87.78±0.61 | 68.40±0.86 | 42.01±0.33 | 53.43±1.57 | 66.63 |
| | Feature-BiLSTM* | 65.95±0.99 | 74.68±0.10 | 77.28±2.83 | 90.37±3.10 | 71.55±7.10 | 46.02±0.38 | 52.17±0.25 | 68.29 |
| | Conventional | 86.93±0.25 | 91.61±0.29 | 83.22±0.42 | 76.94±1.22 | 75.95±2.30 | 45.38±0.02 | 50.54±0.36 | 72.94 |
| | **Disclosed(ELBO)** | 86.81±0.47 | 92.07±0.17 | 83.96±0.22 | 73.25±2.35 | 76.35±0.94 | 46.78±2.92 | 50.78±1.39 | 72.86 |
| | **Disclosed(Ensembles)** | 88.61±0.78 | 92.35±0.16 | 84.62±0.20 | 80.12±1.06 | 76.77±1.13 | 47.95±2.76 | 50.34±3.40 | **74.39** |
| Gradient-free & Likelihood-free | **Disclosed(SNPE)** | 84.37±0.29 | 90.38±0.07 | 80.50±0.10 | 33.11±0.48 | 81.02±1.06 | 39.60±0.49 | 53.07±0.82 | 66.01 |
| | **Disclosed(ABC-SMC)** | 86.51±0.55 | 90.32±0.03 | 81.43±0.41 | 57.41±0.90 | 80.78±0.07 | 40.81±0.24 | 53.37±0.30 | **70.09** |

*FIG. 2A*

Table 2

| Settings | Methods | Dataset #1 | Dataset #2 | Dataset #3 | Dataset #4 | Dataset #5 | Dataset #6 | Dataset #7 | Avg |
|---|---|---|---|---|---|---|---|---|---|
| Gradient-free | Conventional | 0.056±0.014 | 0.032±0.000 | 0.049±0.007 | 0.056±0.032 | 0.115±0.018 | 0.040±0.008 | 0.170±0.069 | 0.074 |
| | **Disclosed(ELBO)** | 0.056±0.007 | 0.025±0.004 | 0.065±0.001 | 0.045±0.028 | 0.058±0.004 | 0.035±0.007 | 0.113±0.030 | **0.057** |
| | **Disclosed(Ensembles)** | 0.058±0.001 | 0.017±0.001 | 0.064±0.009 | 0.085±0.005 | 0.073±0.007 | 0.039±0.004 | 0.134±0.033 | 0.067 |
| Gradient-free & Likelihood-free | **Disclosed(SNPE)** | 0.104±0.005 | 0.082±0.000 | 0.100±0.010 | 0.549±0.004 | 0.314±0.001 | 0.185±0.011 | 0.466±0.002 | 0.257 |
| | **Disclosed(ABC-SMC)** | 0.106±0.009 | 0.084±0.001 | 0.108±0.001 | 0.278±0.026 | 0.309±0.009 | 0.178±0.002 | 0.458±0.004 | **0.217** |

*FIG. 2B*

Table 3

| Settings | Methods | Dataset #1 | Dataset #2 | Dataset #3 | Dataset #4 | Dataset #5 | Dataset #6 | Dataset #7 | Avg |
|---|---|---|---|---|---|---|---|---|---|
| | **Lower-bound** | 0.030 | 0.009 | 0.035 | 0.070 | 0.251 | 0.427 | 0.255 | 0.154 |
| Gradient-free | Conventional(Entropy) | 0.063±0.009 | 0.029±0.001 | 0.082±0.004 | 0.095±0.009 | 0.349±0.002 | 0.519±0.032 | 0.523±0.004 | 0.237 |
| | Conventional(MAXP) | 0.063±0.009 | 0.029±0.001 | 0.077±0.004 | 0.091±0.009 | 0.349±0.002 | 0.513±0.031 | 0.523±0.004 | 0.235 |
| | **ELBO(Entropy)** | 0.053±0.004 | 0.026±0.001 | 0.079±0.001 | 0.123±0.006 | 0.336±0.009 | 0.481±0.065 | 0.508±0.012 | 0.229 |
| | **ELBO(MaxP)** | 0.053±0.004 | 0.026±0.001 | 0.074±0.002 | 0.117±0.005 | 0.336±0.009 | 0.478±0.062 | 0.508±0.012 | 0.227 |
| | **Ensembles(Entropy)** | 0.046±0.006 | 0.023±0.001 | 0.074±0.002 | 0.084±0.004 | 0.324±0.011 | 0.472±0.048 | 0.513±0.048 | 0.219 |
| | **Ensembles(MaxP)** | 0.046±0.006 | 0.023±0.001 | 0.068±0.002 | 0.076±0.004 | 0.324±0.011 | 0.469±0.047 | 0.513±0.048 | **0.217** |
| Gradient-free & Likelihood-free | **SNPE(Entropy)** | 0.065±0.003 | 0.073±0.001 | 0.116±0.005 | 0.551±0.001 | 0.319±0.003 | 0.580±0.009 | 0.466±0.003 | 0.310 |
| | **SNPE(MaxP)** | 0.065±0.003 | 0.073±0.001 | 0.116±0.005 | 0.552±0.002 | 0.319±0.003 | 0.591±0.009 | 0.466±0.003 | 0.312 |
| | **ABC-SMC(Entropy)** | 0.061±0.006 | 0.075±0.002 | 0.110±0.004 | 0.285±0.015 | 0.325±0.006 | 0.571±0.000 | 0.468±0.014 | **0.271** |
| | **ABC-SMC(MaxP)** | 0.061±0.006 | 0.075±0.002 | 0.110±0.004 | 0.288±0.014 | 0.325±0.006 | 0.579±0.000 | 0.468±0.014 | 0.272 |

*FIG. 2C*

Table 4

| Settings | Methods | Dataset #1<br>Dataset #7 | Dataset #2<br>Dataset #7 | Dataset #5<br>Dataset #7 | Dataset #4<br>Dataset #3 | Dataset #6<br>Dataset #5 | Dataset #7<br>Dataset #5 | Avg |
|---|---|---|---|---|---|---|---|---|
| | **Lower-bound** | 0.072 | 0.001 | 0.162 | 0.010 | 0.004 | 0.357 | 0.101 |
| Gradient-free | Conventional(entropy) | 0.124±0.015 | 0.002±0.000 | 0.404±0.006 | 0.058±0.018 | 0.100±0.002 | 0.639±0.024 | 0.221 |
| | Conventional(MaxP) | 0.124±0.015 | 0.002±0.000 | 0.404±0.006 | 0.059±0.014 | 0.098±0.002 | 0.639±0.024 | 0.221 |
| | **Disclosed(ELBO)(Entropy)** | 0.112±0.010 | 0.001±0.000 | 0.320±0.014 | 0.051±0.001 | 0.109±0.002 | 0.635±0.003 | 0.205 |
| | **Disclosed(ELBO)(MaxP)** | 0.112±0.010 | 0.001±0.000 | 0.320±0.014 | 0.056±0.001 | 0.107±0.002 | 0.635±0.003 | 0.205 |
| | **Disclosed(Ensembles)(Entropy)** | 0.097±0.008 | 0.001±0.000 | 0.350±0.038 | 0.057±0.003 | 0.110±0.001 | 0.606±0.047 | 0.204 |
| | **Disclosed(Ensembles)(MaxP)** | 0.097±0.008 | 0.001±0.000 | 0.350±0.038 | 0.058±0.002 | 0.108±0.001 | 0.606±0.047 | **0.203** |
| Gradient-free & Likelihood -free | **Disclosed(SNPE)(Entropy)** | 0.140±0.001 | 0.005±0.000 | 0.402±0.005 | 0.082±0.003 | 0.093±0.001 | 0.592±0.008 | 0.219 |
| | **Disclosed(SNPE)(MaxP)** | 0.140±0.001 | 0.005±0.000 | 0.402±0.005 | 0.081±0.003 | 0.091±0.002 | 0.592±0.008 | 0.219 |
| | **Disclosed(ABC-SMC)(Entropy)** | 0.126±0.009 | 0.005±0.001 | 0.396±0.001 | 0.097±0.021 | 0.092±0.000 | 0.596±0.009 | 0.219 |
| | **Disclosed(ABC-SMC)(MaxP)** | 0.126±0.009 | 0.005±0.001 | 0.396±0.001 | 0.095±0.021 | 0.092±0.001 | 0.596±0.009 | **0.218** |

*FIG. 3A*

Table 5

| Settings<br>Settings | Methods<br>Methods | Dataset #1<br>Dataset #8 | Dataset #2<br>Dataset #8 | Dataset #6<br>Dataset #9 | Dataset #7<br>Dataset #9 | Avg<br>Avg |
|---|---|---|---|---|---|---|
| | **Lower-bound** | 0.960 | 0.147 | 0.259 | 0.950 | 0.579 |
| Gradient-free | Conventional(Entropy) | 0.978±0.003 | 0.315±0.003 | 0.720±0.011 | 0.963±0.008 | 0.744 |
| | Conventional(confidence) | 0.978±0.003 | 0.315±0.003 | 0.705±0.011 | 0.963±0.008 | 0.740 |
| | **Disclosed(ELBO)(Entropy)** | 0.976±0.002 | 0.308±0.006 | 0.692±0.039 | 0.968±0.005 | 0.736 |
| | **Disclosed(ELBO)(MaxP)** | 0.976±0.002 | 0.308±0.006 | 0.678±0.044 | 0.968±0.005 | 0.733 |
| | **Disclosed(ENSEMBLES)(Entropy)** | 0.976±0.001 | 0.297±0.003 | 0.707±0.028 | 0.962±0.002 | 0.736 |
| | **Disclosed(ENSEMBLES)(MaxP)** | 0.976±0.001 | 0.297±0.003 | 0.692±0.032 | 0.962±0.002 | **0.732** |
| Gradient-free & Likelihood -free | **Disclosed(SNPE)(Entropy)** | 0.984±0.000 | 0.365±0.001 | 0.715±0.002 | 0.951±0.000 | 0.754 |
| | **Disclosed(SNPE)(MaxP)** | 0.984±0.000 | 0.365±0.001 | 0.695±0.004 | 0.951±0.000 | 0.749 |
| | **Disclosed(ABC-SMC)(Entropy)** | 0.983±0.001 | 0.365±0.001 | 0.710±0.002 | 0.952±0.000 | 0.753 |
| | **Disclosed(ABC-SMC)(MaxP)** | 0.983±0.001 | 0.365±0.001 | 0.694±0.000 | 0.952±0.000 | **0.749** |

*FIG. 3B*

Algorithm 1 Gradient-free Variational Inference input Training data set $\{(\tilde{x}_i, \tilde{y}_i)\}_{i=1}^{N}$; CMA-ES optimizer ES; Prior distribution $p(z)$; Number of candidate solutions $m$; Total iteration $T$.

Initialize the initial collection of variational parameter, i.e., $\{\lambda_j^{(0)}\}_{j=1}^{m} = \{(\mu_j^{(0)}, \alpha_j^{(0)})\}_{j=1}^{m}$.

for $t = 1, 2, \ldots, T$ do for $j = 1, 2, \ldots, m$ do

Generate $S$ prompt embedding samples from the variational distribution, i.e., $$\{z_s^{(t-1)}\}_{s=1}^{S} \sim N\left(\mu^{(t-1)}, \text{diag}(\alpha_j^{(t-1)})\right)$$

Evaluate the ELBO loss of $j$-th variational distribution i.e., $$\mathcal{L}_j^{(t-1)} = \sum_{i=1}^{N} \sum_{s=1}^{S} \log \text{Cat}\left(\tilde{y}_i | \sigma(h_\theta(\tilde{x}_i; A z_s^{(t-1)} + P_o)\right) - \text{KL}\left(q(z; \lambda_j^{(t-1)}) \| p(z)\right)$$

end

Request a new collection of variational parameter solutions, i.e., $$\{\lambda_j^{(t)}\}_{j=1}^{m} \leftarrow \text{ES}\left(\{\lambda_j^{(t-1)}\}_{j=1}^{m}; \{\mathcal{L}_j^{(t-1)}\}_{j=1}^{m}\right)$$

end output Optimized collection of prompt embedding samples $\{z_s^{(T)}\}_{s=1}^{S}$ corresponding to max ELBO loss.

*FIG. 4*

Algorithm 2 ABC-SMC input PLM $f$; The fixed random projection matrix A and initial prompt Po; Training data set $(\tilde{X}, \tilde{Y}) = \{(\tilde{x}_i, \tilde{y}_i)\}_{i=1}^{N}$; Prior Distribution $p(z)$; initial tolerance $\epsilon_1$; Distance measure function $\rho(\cdot)$; Number of samples $S$; Total iteration $T$.

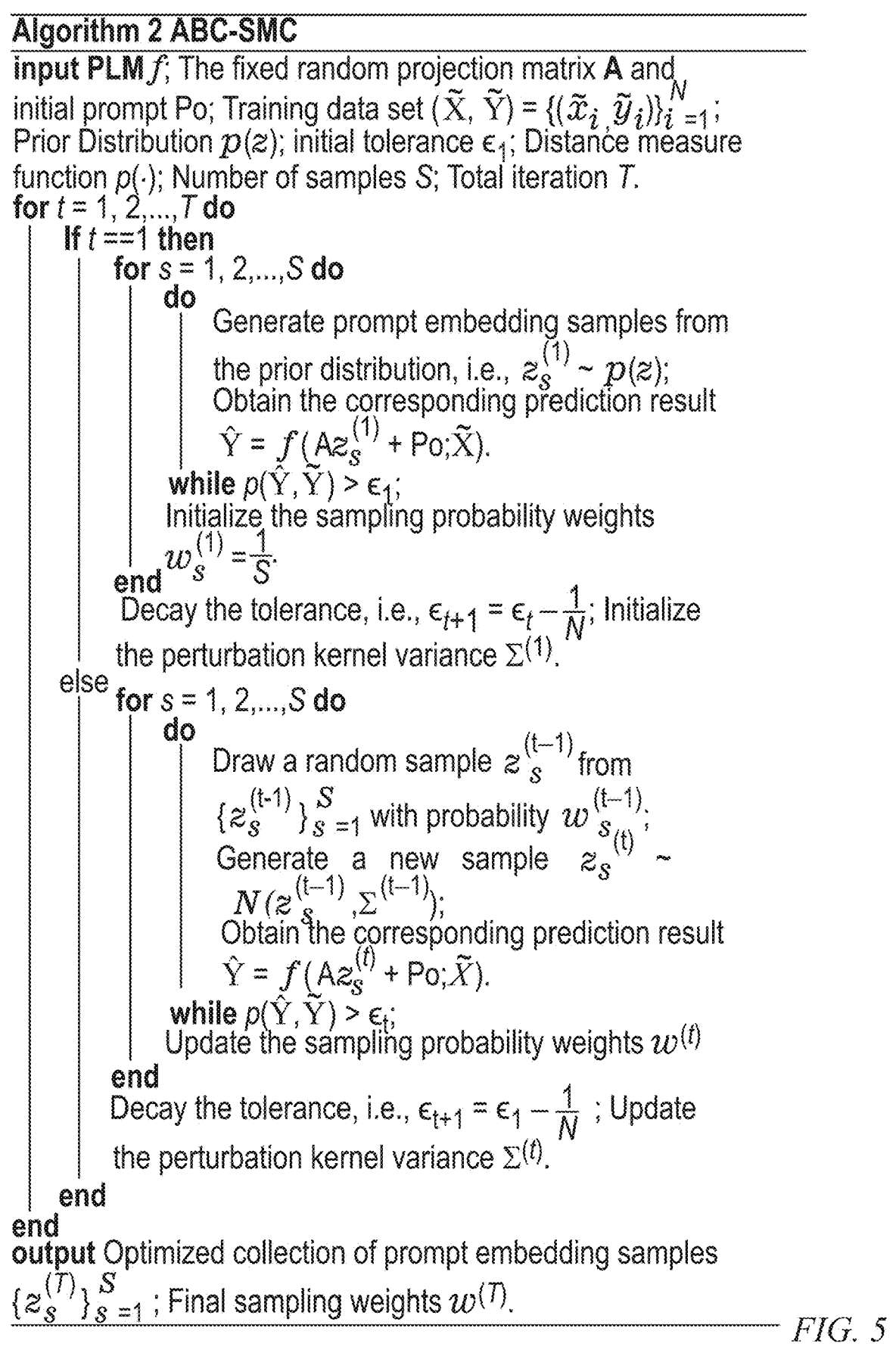

for $t = 1, 2, \ldots, T$ do
  If $t == 1$ then
    for $s = 1, 2, \ldots, S$ do
      do
        Generate prompt embedding samples from the prior distribution, i.e., $z_s^{(1)} \sim p(z)$;
        Obtain the corresponding prediction result $\hat{Y} = f(Az_s^{(1)} + Po; \tilde{X})$.
      while $\rho(\hat{Y}, \tilde{Y}) > \epsilon_1$;
      Initialize the sampling probability weights $w_s^{(1)} = \frac{1}{S}$.
    end
    Decay the tolerance, i.e., $\epsilon_{t+1} = \epsilon_t - \frac{1}{N}$; Initialize the perturbation kernel variance $\Sigma^{(1)}$.
  else
    for $s = 1, 2, \ldots, S$ do
      do
        Draw a random sample $z_s^{(t-1)}$ from $\{z_s^{(t-1)}\}_{s=1}^{S}$ with probability $w_s^{(t-1)}$;
        Generate a new sample $z_s^{(t)} \sim N(z_s^{(t-1)}, \Sigma^{(t-1)})$;
        Obtain the corresponding prediction result $\hat{Y} = f(Az_s^{(t)} + Po; \tilde{X})$.
      while $\rho(\hat{Y}, \tilde{Y}) > \epsilon_t$;
      Update the sampling probability weights $w^{(t)}$
    end
    Decay the tolerance, i.e., $\epsilon_{t+1} = \epsilon_1 - \frac{1}{N}$; Update the perturbation kernel variance $\Sigma^{(t)}$.
  end
end output Optimized collection of prompt embedding samples $\{z_s^{(T)}\}_{s=1}^{S}$; Final sampling weights $w^{(T)}$.

FIG. 5

RELIABLE GRADIENT-FREE AND LIKELIHOOD-FREE PROMPT TUNING

STATEMENT REGARDING PRIOR DISCLOSURES BY THE INVENTOR OR A JOINT INVENTOR

The following disclosure is submitted under 35 U.S.C. 102 (b)(1)(A):

Shen M, Ghosh S, Sattigeri P, Das S, Bu Y, Wornell G. Reliable gradient-free and likelihood-free prompt tuning. arXiv preprint arXiv: 2305.00593. 2023 Apr. 30.

BACKGROUND

The present invention relates generally to the electrical, electronic and computer arts and, more particularly, to machine learning.

Pretrained language models (PLMs) often demonstrate impressive performance. The conventional approach to adapting PLMs to downstream tasks involves fine-tuning the model (model tuning), but such fine-tuning can be computation- and memory-intensive, as a PLM usually contains billions of parameters. For example, a generative pretrained transformer (GPT-3) has 175 billion parameters. A better strategy is prompt tuning, which aims to learn a small number of prompt parameters, such as a real vector of prompt embeddings with 20,000 parameters, while keeping the large PLM frozen.

Due to privacy or commercial constraints, large pretrained language models (PLMs) are often offered as black-box application programming interfaces (APIs). Fine-tuning such models for downstream tasks is challenging, however, because one can neither access the model's internal representations nor propagate gradients through it.

BRIEF SUMMARY

Principles of the invention provide techniques for reliable gradient-free and likelihood-free prompt tuning. In one aspect, an exemplary method includes the operations of: drawing, using at least one hardware processor, prompt embedding samples from a prior distribution and passing the prompt embedding samples into a pretrained model to receive a corresponding token label prediction for a batch of text data; accepting, using the at least one hardware processor, prompt embedding samples from a distribution of a first iteration that satisfy a condition of a distance function between a ground truth label and a corresponding token label prediction being less than a first tolerance; resampling, using the at least one hardware processor, in a next iteration, embeddings from the accepted prompt embedding samples with probability proportional to weights and perturbing the resampled embeddings via a perturbation kernel to obtain a new sample; propagating, using the at least one hardware processor, the perturbed resampled embeddings through the pretrained model; projecting to a higher dimension than a dimension of the resampled embeddings, using the at least one hardware processor, the resampled embeddings that satisfy a condition of the distance function between the ground truth label and the corresponding token label prediction being less than a second tolerance, where the second tolerance is decayed by one step per iteration; concatenating the projected resampled embeddings with an embedding of a given input; and performing inferencing by inputting the concatenated embeddings into the pretrained model.

In one aspect, a computer program product includes one or more tangible computer-readable storage media and program instructions stored on at least one of the one or more tangible computer-readable storage media; the program instructions are executable by a processor, and the program instructions include: drawing, using at least one hardware processor, prompt embedding samples from a prior distribution and passing the prompt embedding samples into a pretrained model to receive a corresponding token label prediction for a batch of text data; accepting, using the at least one hardware processor, prompt embedding samples from a distribution of a first iteration that satisfy a condition of a distance function between a ground truth label and a corresponding token label prediction being less than a first tolerance; resampling, using the at least one hardware processor, in a next iteration, embeddings from the accepted prompt embedding samples with probability proportional to weights and perturbing the resampled embeddings via a perturbation kernel to obtain a new sample; propagating, using the at least one hardware processor, the perturbed resampled embeddings through the pretrained model; projecting to a higher dimension than a dimension of the resampled embeddings, using the at least one hardware processor, the resampled embeddings that satisfy a condition of the distance function between the ground truth label and the corresponding token label prediction being less than a second tolerance, where the second tolerance is decayed by one step per iteration; concatenating the projected resampled embeddings with an embedding of a given input; and performing inferencing by inputting the concatenated embeddings into the pretrained model.

In one aspect, a system includes a memory and at least one processor, coupled to the memory, and operative to perform operations including: drawing, using at least one hardware processor, prompt embedding samples from a prior distribution and passing the prompt embedding samples into a pretrained model to receive a corresponding token label prediction for a batch of text data; accepting, using the at least one hardware processor, prompt embedding samples from a distribution of a first iteration that satisfy a condition of a distance function between a ground truth label and a corresponding token label prediction being less than a first tolerance; resampling, using the at least one hardware processor, in a next iteration, embeddings from the accepted prompt embedding samples with probability proportional to weights and perturbing the resampled embeddings via a perturbation kernel to obtain a new sample; propagating, using the at least one hardware processor, the perturbed resampled embeddings through the pretrained model; projecting to a higher dimension than a dimension of the resampled embeddings, using the at least one hardware processor, the resampled embeddings that satisfy a condition of the distance function between the ground truth label and the corresponding token label prediction being less than a second tolerance, where the second tolerance is decayed by one step per iteration; concatenating the projected resampled embeddings with an embedding of a given input; and performing inferencing by inputting the concatenated embeddings into the pretrained model.

In another aspect, another exemplary method, according to another aspect of the invention, includes the operations of: initializing, using at least one hardware processor, an initial collection of a variational parameter; generating, using the at least one hardware processor, prompt embedding samples from a given variational distribution of prompts; evaluating, using the at least one hardware processor, an evidence lower bound loss of the given variational distribution; optimizing, using the at least one hardware processor, the variational parameter using an evolution strategy based on the evidence lower bound loss to generate an optimal variational distribution; sampling optimal prompt embeddings from the optimal variational distribution; projecting, using the at least one hardware processor, the optimal prompt embeddings to a higher dimension than a dimension of the optimal prompt embeddings; concatenating the projected optimal prompt embeddings and an embedding of a given input; and performing inferencing by inputting the concatenated embeddings into the pre-trained model.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

- improvements to the prediction performance of PLM while inducing robustness and reliability tune soft prompts without requiring gradient computation;
- no need to access any internal representation of the PLM beyond the input embeddings, thus enabling tuning when only having API access to the PLM;
- instead of learning a single prompt, example embodiments learn a distribution over prompts enabling the quantification of predictive uncertainty and more reliable prompt tuning;
- demonstrated improvement of calibration and UQ performance on several tasks, including selective classification and text Out-of-Distribution (OOD) detection; and
- a much stricter notion of black-box setting, i.e., likelihood-free setting, is considered where the PLM-based API does not provide probability scores or logits as the output, but only the discrete outcome labels.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIGS. 2A, 2B, and 2C and FIGS. 3A and 3B illustrate the results of experimental evaluations, in accordance with example embodiments;

FIG. 4 is exemplary pseudocode for a gradient-free variational inference method, in accordance with example embodiments;

FIG. 5 is exemplary pseudocode for a sequential Monte-Carlo approximate Bayesian computation method, in accordance with example embodiments.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Due to privacy risks, legal and commercial constraints, and the like, large pre-trained language models (PLMs) are often offered as black-box application programming interfaces (APIs); i.e., an API whose behavior has to be observed entirely by inputs and outputs, without knowledge of the underlying logic/internal structure used to obtain the outputs from the inputs. Conventional prompt-tuning techniques assume access to the model's internal representations or propagate gradients through the model. These challenges are advantageously addressed by the exemplary embodiments for adapting PLMs having only API access. Building on soft prompt tuning, example embodiments tune soft prompts without requiring gradient computation. Further, extensions are disclosed that, in addition to not requiring gradients, also do not need to access any internal representation of the PLM beyond the input embeddings. Moreover, instead of learning a single prompt, example embodiments learn a distribution over prompts enabling the quantification of predictive uncertainty. Finally, through extensive experiments, exemplary embodiments were carefully vetted and were found to be competitive with (and sometimes even improving on) gradient-based approaches with full access to the PLM.

Introduction

Pre-trained language models (PLMs) are versatile learners and demonstrate impressive few-shot capabilities and promising performance on various downstream tasks, such as text classification, commonsense reasoning, question answering, and machine translation.

The conventional approach to adapting PLMs to downstream tasks involves fine-tuning the model. Although fine-tuning is effective, it can be challenging to do in practice. First, fine-tuning large language models is a compute- and memory-intensive process. For example, a large model like GPT-3 contains billions of parameters. Further, it is inefficient to adapt a PLM to a large number of downstream tasks, since each task would require storing a copy of the model parameters.

Figure 1A:
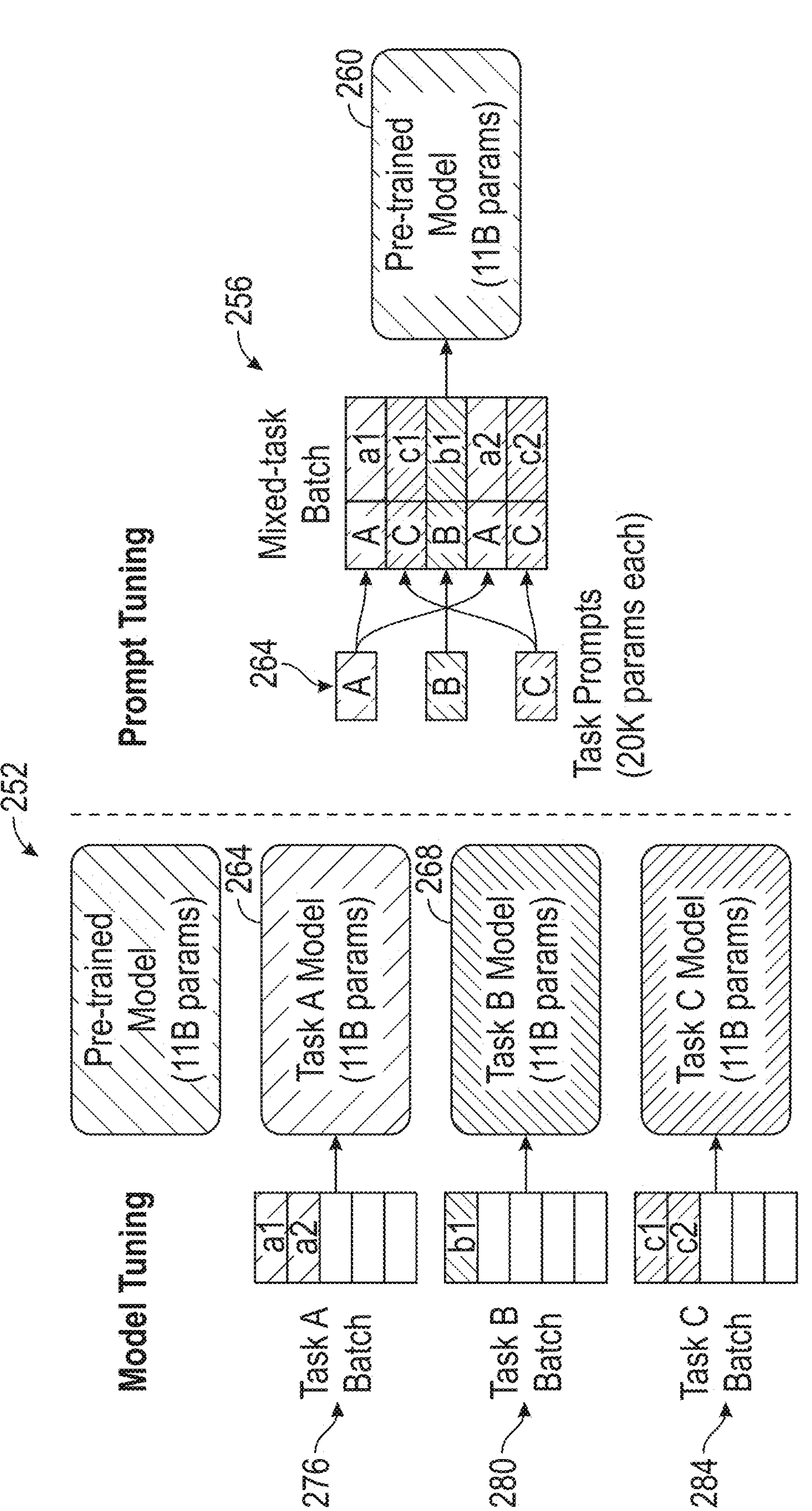
FIG. 1A is an example workflow for performing conventional prompt tuning, in accordance with example embodiments.

Prompt tuning alleviates these issues by providing an efficient way to adapt a PLM to a downstream task. FIG. 1A is an example workflow for performing conventional model tuning and prompt tuning, in accordance with example embodiments. In the conventional model tuning approach (left-side of FIG. 1A), a pre-trained model 252 is tuned for a particular task, such as Task A 276, Task B 280, Task C 284, and the like, to create a Task A model 264, a task B model 268, and so on. In the conventional prompt tuning approach (right-side of FIG. 1A), prompts 264, including a Prompt A for Task A, a Prompt B for Task B, and a Prompt C for Task C are used to create a mixed-task batch of prompts 256. The mixed-task batch of prompts 256 includes the prompts 264, such as Prompt A combined with a corresponding input sample, such as input sentence a1. Each prompt 264 guides the pre-trained model 260 to classify the input sample, such as to classify the input sentence a1. (Soft) Prompt Tuning generates a sequence of prompt tokens (or real embeddings) that are concatenated with the input text tokens (embeddings) and the combined sequence is fed into the PLM. (Soft) Prompt Tuning only learns a small number of prompt parameters while keeping the large PLM frozen, but still achieves comparable performance to fine-tuning the entire PLM.

Although more efficient than traditional fine-tuning, prompt tuning still requires the propagation of gradients through the entire PLM. For each downstream task (such as text classification, machine translation, and the like), the PLM outputs predictions for evaluating the loss and back-propagates the gradient to update the corresponding prompts while keeping the PLM frozen. Beyond being computationally expensive, this may not be possible due to privacy risks, legal and commercial constraints, and the like. In fact, large PLMs are often only made available in the form of black-box APIs. A recent line of research has started exploring gradient-free approaches to prompt tuning. A first conventional tuning framework optimizes continuous prompt by leveraging the derivative-free optimization algorithms, and a second conventional tuning framework improves over the first conventional tuning framework by optimizing multiple deep prompts at various intermediate layers of PLM. Although these approaches are gradient-free, they still assume that intermediate layers of the model being tuned are accessible.

Moreover, when deploying a natural language processing (NLP) model in a real-world setting, it is inevitable to encounter unexpected scenarios. For example, the test data to be predicted might originate from out-of-distribution resources. For the model to be useful in such scenarios, it is pertinent that the model is able to quantify the uncertainty associated with its predictions and that these uncertainties are well-calibrated. Conventional prompt-tuning techniques, however, may not be reliable or trustworthy, i.e., there is a lack of capability of uncertainty quantification (UQ) (let the model be equipped with the ability to quantify the uncertainty associated with its predictions; for example, by adding an extra layer to the model.) To this end, the limits of gradient-free prompt tuning are further enhanced in two aspects:

First, exemplary techniques that add a layer of uncertainty quantification (UQ) aimed toward more reliable prompt tuning are disclosed herein. It is shown that in one or more exemplary embodiments, this improves calibration and UQ performance on several tasks, including selective classification and text Out-of-Distribution (OOD) detection.

Second, a much stricter notion of black-box setting, i.e., likelihood-free setting, is considered in one or more exemplary embodiments, where the PLM-based API does not provide probability scores or logits as the output, but only the discrete outcome labels. An exemplary simulation-based-inference approach is disclosed that yields competitive performance in the stricter setting even compared to the state-of-the-art (SOTA) prior works on the relaxed black-box setting.

Background

Prompt Tuning Prompting, in the simplest form, involves appending manually curated words or tokens to a text input such that the language model, conditioned on such an augmented input, generates the desired output. Such curated prompts were shown to be much more efficient than fine-tuning the entire PLM. However, curating good prompts for a new task can be difficult without deep domain expertise. One solution is to search the space of discrete prompts. This search in discrete space can be a hard optimization problem. Recent works instead learn continuous or soft prompts in the form of a small number of free parameters injected into certain layers of the PLM. In example embodiments, the simpler form of continuous prompt tuning is worked with, where the free parameters are only injected in the embedding layer.

Gradient-Free Prompt Tuning

Gradient-free prompt tuning aims to learn the continuous prompt without the propagating gradients through the PLM. Since one goal is to treat the PLM as a black-box, example embodiments focus on the conventional problem setting of gradient-free prompt tuning without accessing any gradients or internals of a black-box model of a conventional approach that learns a single prompt at the input layer.

Beyond Point-Estimates of Prompts

Many applications demand accurate quantification of uncertainty in predictions. This can be achieved in the prompt-tuning setting by not just learning a point estimate of the prompts, but also inferring a distribution over the prompts for a given downstream task. In a non-black-box setting, to infer such a distribution, classical frequentist or Bayesian approaches can be applied. Quantifying uncertainty in prompt-tuned large language models has historically been a severely under explored area.

Simulation-Based Inference

Classic approaches for statistical inference, for example, approaches which rely on a likelihood, such as Bayesian inferencing) are intractable when the likelihood function is not accessible. The problem of inferring parameters of such a black-box model, called Simulation-based Inference (SBI), is gaining popularity. Traditional SBI approaches include Approximate Bayesian Computation (ABC) and synthetic likelihood (SL). More recently, the neural density estimation-based approaches utilize the powerful deep neural network density estimator to directly learn the likelihood, i.e., Sequential Neural Likelihood Estimation (SNLE), or the likelihood ratio, i.e., Sequential Neural Ratio Estimation (SNRE), or the posterior, i.e., Sequential Neural Posterior Estimation (SNPE).

Problem Formulation

In example embodiments, a focus is on text classification and the few-shot learning setting considered in the first conventional tuning framework. Given a dataset $$\mathcal{D} = (X, Y) = \{(x_i, y_i)\}_{i=1}^{N}$$

and a pre-trained language model (PLM) $f$, an aim is to adapt $f$ to predict the label $y_*$ for an unseen text passage $x_*$. The classification task is formulated as a masked language modeling problem, where the input text $x_i$ is converted into $\tilde{x}_i$ via predefined templates, e.g., adding trigger words like "It was [MASK]", and the labels $y_i$ are mapped to label tokens $\tilde{y}_i$ in the vocabulary such as "great" or "bad". This transformed dataset is denoted $\tilde{\mathcal{D}}=(\tilde{X},\tilde{Y})$.

Soft prompt tuning has been used to adapt $f$, i.e., a continuous prompt embedding $P\in\mathbb{R}^D$ is constructed and fed along with the converted input text $\tilde{x}_i$ to the PLM $f$ to generate a label token, $\hat{y}_i=f(\tilde{x}_i;P)$, where the notation $\hat{y}_i=f(\tilde{x}_i;P)$ is short hand for $\hat{y}_i=\mathrm{Cat}(\sigma(h_\theta(\tilde{x}_i;P)))$. Here, Cat denotes the Categorical distribution, $\sigma$ is the SoftMax function, and $\theta$ represents the frozen parameters of the PLM. $h_\theta$ is used to denote all but the final layer of the PLM $f$. Finally, an aim is to learn an optimal prompt $$P^* = \arg_P\min - \sum_{i=1}^{N}\log\ Cat\ (\tilde{y}_i \mid \sigma(h_\theta(\tilde{x}_i;P))) \tag{1}$$

This is just the standard cross-entropy loss and can be easily minimized using standard stochastic gradient based approaches provided (i) gradients can be propagated through the PLM $f$, and (ii) the PLM's logits, i.e., $h_\theta(\tilde{x}_i;P)$, can be accessed. The problem becomes substantially more challenging when these requirements are not satisfied.

When it is not possible to propagate gradients through $f$, gradient-free approaches need to be relied on to optimize Equation 1. Recent work has demonstrated promising gradient-free prompt tuning results by first employing a lower dimensional re-parameterization, $z\in\mathbb{R}^D$ with $d<<D$, $P=Az+P_0$, where $A\in\mathbb{R}^{D\times d}$ is a random projection matrix and $P_0$ is a fixed prompt embedding, and then using gradient-free evolutionary algorithms, in particular, Covariance Matrix Adaptation Evolution Strategy (CMA-ES) to optimize, $$z^* = \arg_z\min - \sum_{i=1}^{N}\log\ Cat\ (\tilde{y}_i \mid \sigma(h_\theta(\tilde{x}_i;Az+P_0))) \tag{2}$$

One or more embodiments employ this lower dimensional parameterization, but instead of learning a point estimate $z^*$, a distribution $p(z|\tilde{\mathcal{D}})$ is learned in a gradient-free setting. Similar to the point estimated variants, the disclosed algorithms for learning $p(z|\tilde{\mathcal{D}})$ also rely on CMA-ES.

Next, the fully black-box setting is considered—likelihood-free and gradient-free. Here, beyond being unable to propagate gradients through $f$, a further handicap of the black-box setting is only being able to observe the predicted label tokens, $\hat{y}_i=f(\tilde{x}_i;P)$ for each training instance $\tilde{x}_i$, and not the corresponding logits, i.e., $h_\theta(\tilde{x}_i;P)$. In this more challenging setting, covariance matrix adaptation evolution strategy (CMA-ES) based approaches were found to be unreliable, often getting stuck in poor optima. Instead, it was found effective to pose the likelihood-free and gradient-free prompt tuning task as a simulation-based inference (SBI) problem. The PLM $f$ is viewed as a black-box simulator that, given a realization of z and the text $\tilde{x}_i$, produces $\hat{y}_i$. A sequential Monte-Carlo approximate Bayesian computation (SMC-ABC) approach was then used to infer the distribution $p(z|\tilde{\mathcal{D}})$.

Finally, the distribution $p(z|\tilde{\mathcal{D}})$ was used to characterize the uncertainty in predictions via the predictive distribution $p(\tilde{y}|\tilde{x},\tilde{\mathcal{D}})=\int p(\tilde{y}|\tilde{x},z)p(z|\tilde{\mathcal{D}})dz$. Monte-Carlo approximations to this integral are formed. In the gradient-free case, this is, $$p(\tilde{y} \mid \tilde{x}, \tilde{\mathcal{D}}) \approx \frac{1}{S}\sum_{s=1}^{S} p(\tilde{y} \mid \tilde{x}, z_s)$$

where $z_s\sim p(z|\tilde{\mathcal{D}})$. In the likelihood-free and gradient-free case, since there is only access to the label tokens, the predictive distribution is approximated, $$p(\tilde{y}=c \mid \tilde{x};\tilde{\mathcal{D}}) \approx \frac{1}{S}\sum_{s=1}^{S} 1\{\hat{y}_s=c\}, \tag{3}$$

where $\hat{y}_s=f(x;Az_s+P_0)$, $z_s\sim p(z|\tilde{\mathcal{D}})$). In the section entitled "Experiment Results," it is empirically demonstrated that, by characterizing the uncertainty in z through $p(z|\tilde{\mathcal{D}})$, better calibrated predictive uncertainties are determined, improved selective classification, and out-of-distribution detection.

Methods

Below, two algorithms for the gradient-free setting are described in the sections entitled "Prompt Ensembles" and "Gradient-free Variational Inference." After that, focus is on addressing the gradient-free and likelihood-free setting from the SBI perspective in the section entitled "SBI-based Algorithm for Likelihood-free Prompt Tuning."

Prompt Ensembles

Deep ensembles are a simple yet effective technique for quantifying uncertainty in deep neural network predictions. They generate a uniformly-weighted ensemble by re-training the same neural network from different random initialization. Leveraging the CMA-ES algorithm, this idea is adapted to gradient-free prompt tuning.

CMA-ES is an evolutionary strategy that maintains a multivariate normal distribution $$N(m_t, \sigma_t^2 C_t)$$

over a population of solutions. Each iteration of the algorithm involves sampling a set of possible solutions and updating the normal distribution to favor low loss solutions. To build a prompt ensemble, S instances of CMA-ES are run, each initialized with a different random initialization of the mean $m_t$ and variance $$\sigma_t^2$$

and record the optimized prompt embeddings produced by each instance. This collection of S prompt embeddings $$\{z_s\}_{s=1}^{S}$$

form the distribution $p(z|\tilde{\mathcal{D}})$ and are used to approximate the predictive distribution via Equation 2.

Gradient-Free Variational Inference

An alternative way to estimate the predictive distribution is by approximating the posterior distribution of prompt embedding $p(z|\tilde{\mathcal{D}})$. Since direct computation of posterior is intractable, in the disclosed setting, variational inference (VI) is resorted to and the posterior distribution with a tractable surrogate $q(z;\lambda)$ is approximated, where $\lambda$ denotes the variational parameters. VI minimizes KL-divergence between variational distribution and true posterior distribution with respect to $\lambda$, i.e., $\lambda^*=\arg\min_\lambda KL(q(z;\lambda)\|p(z|\tilde{\mathcal{D}}))$. This is equivalent to maximizing the evidence lower bound (ELBO), i.e., $$\lambda^* = \arg_\lambda \max \mathbb{E}_{q(z,\lambda)}\left[\log p(\tilde{\mathcal{D}} \mid z)\right] - KL(q(z;\lambda)\|p(z)) \tag{4}$$

$$\lambda^* = \arg_\lambda \max \sum_{i=1}^{N} \mathbb{E}_{q(z,\lambda)}[\log\ Cat\ (\tilde{y}_i \mid \sigma(h_\theta(\tilde{x}_i;P)))] - KL(q(z;\lambda)\|p(z)) \tag{5}$$

where $P=Az+P_0$, and $p(z)$ denotes the prior distribution, which is assumed to be a normal distribution with zero mean and diagonal covariance matrix, i.e., $\mathcal{N}(0,\sigma \cdot I)$. Optimizing the ELBO objective requires taking derivative with respect to/as well as computing the gradient of log likelihood with respect to z, i.e., $\Delta z \mathbb{E}_{q(z,\lambda)}[\log \text{Cat}(\tilde{y}_i|\sigma(h_0(\tilde{x}_i;Az+P_0)))]$, which causes standard variational inference algorithms to be infeasible in the gradient-free setting.

Instead of back-propagation, an exemplary gradient-free variational inference algorithm leveraging the derivative-free optimizer CMA-ES is disclosed. Specifically, the variational distribution is considered as a multivariate normal distribution $q(z;\lambda)=\mathcal{N}(\mu,\Sigma)$, where the covariance matrix is assumed to be diagonal, i.e., $\Sigma=\text{diag}(\alpha)\in\mathbb{R}^{d\times d}$. The variational parameter, as the target for optimization, is defined as the mean and diagonal elements of the covariance matrix, i.e., $\lambda=(\mu,\alpha)\in\mathbb{R}^{2d}$. At each iteration of the optimization, the CMA-ES outputs a collection of candidate solutions $$\{\lambda_j\}_{j=1}^m = \{(\mu_j, \alpha_j)\}_{j=1}^m.$$

For each candidate variational parameter $\lambda_j$, the corresponding ELBO loss is evaluated using the variational distribution $q(z;\lambda_j)=\mathcal{N}(\mu_j,\text{diag}(\alpha_j))$, where the expectations in Equation 5 are approximated by Monte-Carlo samples obtained from the variational distribution. Finally, the CMA-ES optimizer takes the current collection of variational parameter $$\{\lambda_j\}_{j=1}^m$$

and their corresponding ELBO loss to conduct the next iteration of optimization.

Figure 1B:
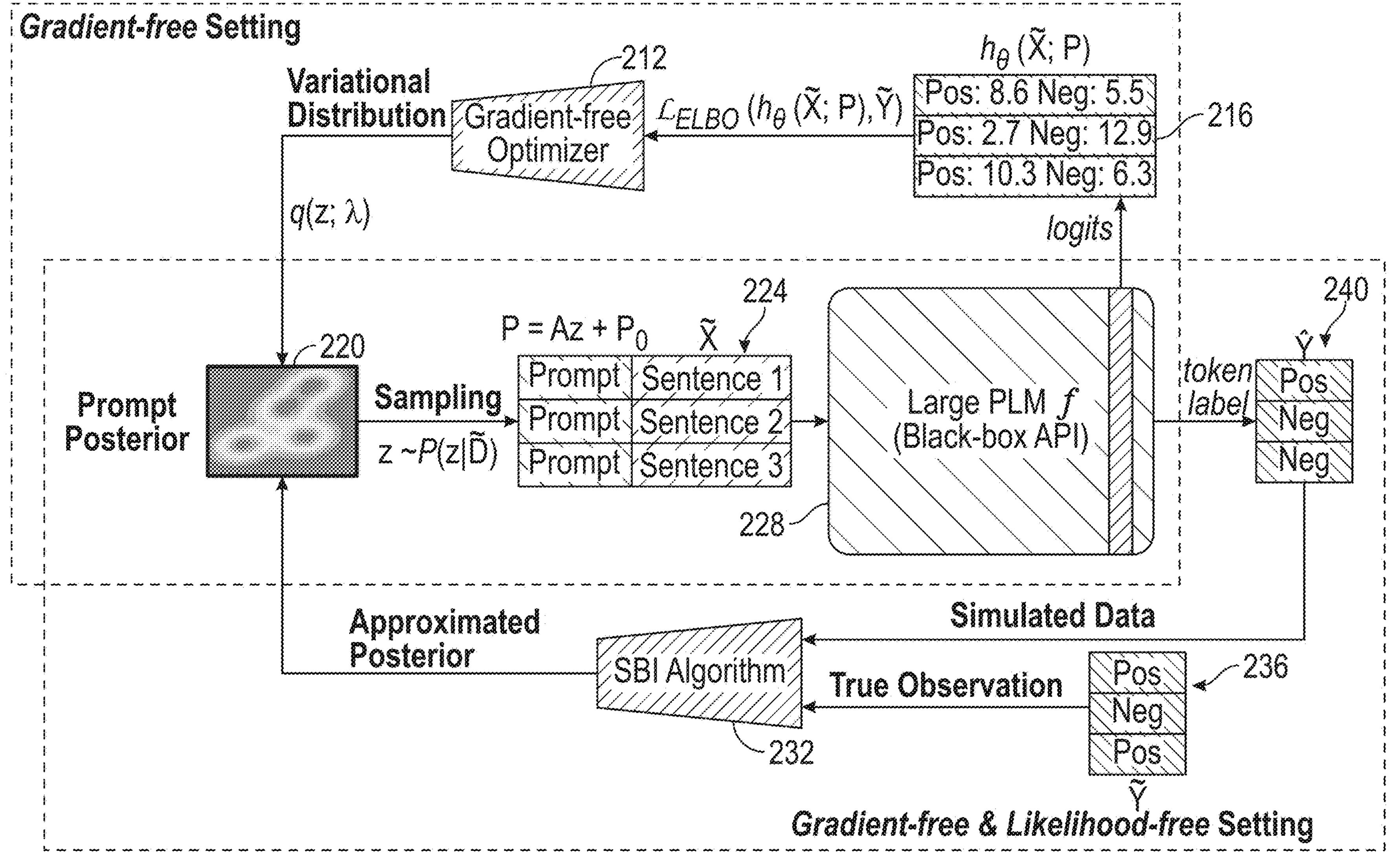
FIG. 1B is an example workflow for performing prompt tuning, in accordance with example embodiments.

FIG. 1B is an example workflow for performing prompt tuning, in accordance with example embodiments. In one example embodiment, a mixed-task batch of prompts 224 is constructed by concatenating one of the prompts 264 with an input sample, such as Sentence 1. The mixed-task batch of prompts 224 may be used to train a large PLM 228. In addition, the mixed-task batch of prompts 224 may be combined with input samples to perform inferencing operations using the large PLM 228. For each submitted input sample, the large PLM 228 generates a classification label 240. As illustrated in FIG. 1B, Sentence 1 has a positive result, Sentence 2 has a negative result, and Sentence 3 has a negative result. In the gradient-free setting (top path of FIG. 1B; see Algorithm 1), the large PLM 228 generates logits 216 that include likelihood(s) (probability score(s)) for each input sample. The gradient-free optimizer 212 generates a distribution of prompts; that is, generates prompt posterior 220. The prompt posterior 220 is then sampled to generate each prompt for the mixed-task batch of prompts 224.

In the gradient-free and likelihood-free setting (bottom path of FIG. 1B; see Algorithm 2), the classification labels 240 generated by the large PLM 240 are compared to ground truth classifications 236 by an SBI algorithm 232. The SBI algorithm 232 generates a distribution of prompts; that is, prompt posterior 220, based on the results of the comparisons of the classification labels 240 and the ground truth classifications 236. A general goal is to estimate the posterior distribution of prompts. The gradient-free setting uses the internal logits of PLM 228 for optimization. An exemplary gradient-free variational inference (GVI) approach utilizes the likelihood to compute the ELBO objective and leverage the gradient-free optimizer to optimize the variational distribution. The gradient-free and likelihood-free setting can be formulated as an SBI problem, where the PLM 228 is treated as a black-box simulator, and its output discrete outcome labels are the simulated data. The posterior samples can be efficiently approximated by the disclosed ABC-SMC algorithm.

After the optimal variational parameter $\lambda^*$ that maximizes the ELBO loss is obtained, the predictive label distribution can be estimated by taking Monte Carlo samples from the optimal variational distribution, i.e., $q(z;\lambda^*)=\mathcal{N}(\mu^*,\Sigma^*)$.

SBI-Based Algorithm for Likelihood-Free Prompt Tuning

The disclosed approach addresses the gradient-free and likelihood-free case. For this problem, the most naive algorithm applicable is the rejection approximation Bayesian computation (ABC) that repeatedly samples from a prior distribution $z\sim p(z)$ and obtains the corresponding simulated observation $\tilde{Y}$. The algorithm only accepts the sampled prompt embedding if the simulated observation is sufficiently close to the ground truth observation based on a distance function $\rho$ and tolerance $\epsilon$, i.e., $\rho(\hat{Y},\tilde{Y})<\epsilon$. The collection of accepted samples can be used to approximate the posterior distribution. However, rejection ABC typically suffers from poor computational efficiency, especially when $\epsilon$ is small and the dimensionality of observations is large. In preliminary experiments, rejection ABC was found to not be effective for the goals herein. Instead, a more advanced technique—sequential Monte Carlo approximate Bayesian computation (ABC-SMC) algorithm was adapted to enable efficient prompt posterior inference. A pertinent aspect of ABC-SMC is to use a sequential tolerance schedule, i.e., $\epsilon_1>\epsilon_2>, \ldots, >\epsilon_T$ to construct a sequence of intermediate distributions, which gradually converges to the true posterior distribution.

First, prompt embedding samples 224 are drawn from the prior $p(z)=\mathcal{N}(0,\sigma\cdot I)$ and are passed into PLM $f$ 228 to receive the corresponding token label prediction Y 240 for a batch of text data $\tilde{X}$ 224. Then, S samples $$\{z_s^{(1)}\}_{s=1}^S$$

that satisfy the condition $\rho(\hat{Y},\tilde{Y})<\epsilon_1$ are accepted. Accuracy is used as the distance function $\rho$. In the next iteration, embeddings are resampled from $$\{z_s^{(t-1)}\}_{s=1}^S$$

with probability proportional to weights $w^{(t-1)}$, and the sampled embeddings are perturbed via a perturbation kernel to obtain a new sample, i.e., $z^{(t)} \sim \mathcal{N}(z^{(t-1)}, \Sigma^{(t-1)})$. Again, these sampled embeddings are propagated through the PLM $f$ 228 and the newly proposed embeddings, $$\{z_s^{(t)}\}_{s=1}^S,$$

are accepted if $\rho(\hat{Y}, \tilde{Y}) < \epsilon_t$, where the tolerance $\epsilon_t$ is decayed by one step per iteration, i.e., $$\epsilon_{t+1} = \epsilon_t - \frac{1}{N},$$

where N is the total number of training data. Finally, the weights $w^{(t)}$ and the variance of the perturbation kernel are updated after each iteration.

Implementation Details of ABC-SMC

Updating of $w^{(t)}$

In the ABC-SMC algorithm, the sampling weights are initialized as a uniform distribution at the first iteration t=1 as all the samples are sampled from the prior distribution p(z). In the later iterations, the new samples are drawing from a mixture proposal distribution consisting of the previous samples and the perturbation kernel, i.e., $$\sum_{s=1}^S w_s^{(t-1)} \cdot \mathcal{N}\left(z_s^{(t-1)}, \sum^{(t-1)}\right).$$

The weights are updated in an importance sampling manner as the ratio between the prior probability and the proposal probability, i.e., $$w_s^{(t)} = \frac{p(z_s)}{\sum_{s=1}^S w_s^{(t-1)} \cdot \mathcal{N}\left(z_s^{(t-1)}, \sum^{(t-1)}\right)}.$$

Updating of $\Sigma^{(t)}$

The covariance $\Sigma^{(t)}$ in the perturbation kernel is a diagonal covariance matrix $\mathrm{diag}(\alpha^{(t)})$, where the diagonal elements $\alpha^{(t)}$ are updated using the weighted empirical variance of previous collection of samples, i.e.

$$\alpha^{(t)} = \sum_{s=1}^S w_s^{(t-1)} \cdot \left(z_s^{(t-1)} - \bar{z}^{(t-1)}\right)^2$$

where $$\bar{z}^{(t-1)} = \sum_{s=1}^S w_S^{(t-1)} \cdot z_s^{(t-1)}$$

is the mean.

Empirically, it is found that simply using uniform weights leads to better performance (more discussion in the section entitled "Discussions"). These steps are repeated for T iterations until the tolerance Et is sufficiently small.

The final collection of prompt samples $$\{z_s^{(T)}\}_{s=1}^S$$

form an approximation to the posterior $p(z|\tilde{\mathcal{D}})$ and Equation 3 is used to derive the approximate predictive distribution.

Experiment Results

The uncertainty quantification applications are introduced below with a description of the experiment settings. Then, the main results are presented in terms of prediction performance and UQ quality. Finally, an ablation study and relevant perspectives of comparison are provided.

Settings

Uncertainty Quantification Applications

The performance of the uncertainty quantification from three perspectives is assessed below: (1) Calibration—the typical UQ quality metric that measures how well the model confidence aligned with the correctness of its prediction; (2) Selective Classification—aims to avoid the risk of wrong predictions by abstaining the prediction for samples with high uncertainty; and (3) OOD Detection—aims to identify the out-of-distribution data that is unobserved during the training stage. The OOD data can exhibit different forms of distribution shift, including the covariate shift where the OOD data distribution is different from the training samples; and the semantic shift where the OOD data contain an unobserved class. In the disclosed experiments, focus is on two types of OOD tasks: the Far OOD detection task where both covariate shift and semantic shift happen simultaneously; and the Near OOD detection task where the OOD data only contain a covariate shift, but have the same class label words.

Benchmark

For a comprehensive comparison with the first conventional tuning framework, the same text classification benchmark datasets are mainly employed as the first conventional tuning framework.

Both calibration and selective classification tasks are conducted using the original test samples for each benchmark dataset. For the far OOD detection task, the in-distribution (ID)/OOD dataset pairs are created by combining two datasets belonging to two different tasks, e.g., a conventional dataset of sentences extracted from movie news and a conventional dataset from a series of textual entailment challenges. For the near OOD detection task, a conventional binary sentiment analysis dataset based on movie reviews is used for the sentiment analysis task and a conventional multi-genre natural language inference corpus is used for the natural language inference (NLI) task.

Baselines

For prediction performance, besides the SOTA gradient-free prompt tuning approach of the first conventional tuning framework, other gradient-free methods are also compared with: (1) The naive Manual Prompt that uses the hand-crafted prompt templates; (2) In-context Learning; (3) Feature-based approaches that train auxiliary models on top of the PLM extracted features, including Feature-MLP (multi-layer perceptron) training a MLP classifier and Feature-Bi long short-term memory (Feature-BiLSTM) training a long short-term memory (LSTM) model followed by a classifier. Additional results of gradient-based approaches are included: (1) Model Tuning that fine-tunes the entire PLM;

(2) Prompt Tuning that only trains the continuous prompt without modifying PLM; (3) P-Tuning v2 that trains the several continuous prompts injected at different layers of PLM. For uncertainty quantification tasks, few existing prompt tuning works aim to tackle this problem, so comparison is mainly made with the first conventional tuning framework to justify how a limitation of the first conventional tuning framework can be addressed under the gradient-free setting.

Implementation Details

The same experiment setting as in the first conventional tuning framework was followed. Focus was on text classification as a few-shot learning problem, motivated by the fact that labeled training data can be limited in practice. Specifically, few-shot training and validation data are constructed by drawing 16 random samples for each class from the original training dataset. The prediction performance is evaluated on the original development or test set, depending on the datasets. The same PLM model ROBERTaLARGE (Robustly Optimized Bidirectional Encoder Representations from Transformers Large model) used as the backbone model and the hyper-parameter is kept the same as in the first conventional tuning framework. Specifically, the prompt length is set as 50, i.e., D=50×1024, and the subspace dimensionality as d=500. The only modification adapted was the normal distribution to generate the random projection matrix A, instead of the uniform distribution used in the first conventional tuning framework. For a fair comparison, the results of the first conventional tuning framework were reproduced using the random projection generated from normal distribution.

All of our experiment results are reported with means and standard deviations over three trials, each with a different random seed. The experiments are implemented in a conventional machine learning framework, and each run of the disclosed methods requires less than 24 hours of training computation time (on a single conventional graphics processing unit (GPU)). Example algorithms generate a collection of S prompt samples to estimate the predictive label distribution. S was set to 10, 100, 100 for a conventional ensemble method, a conventional gradient-free variational inference method, and ABC-SMC, respectively. The total budget for the derivative-free optimizer CMA-ES is set to be 300 with a population size of 20. The same prior distribution p(z) was used for all algorithms, which is assumed to be a normal distribution with zero mean and diagonal covariance matrix, i.e., $\mathcal{N}(0,\sigma\cdot I)$. σ controls how concentrated the prior distribution is, and σ=50 was used in the disclosed experiments. In ABC-SMC, the distance measure function ρ is defined as the prediction error rate, i.e., the portion of wrongly predicted data among the whole data batch. The initial tolerance $\epsilon_1$ in ABC-SMC is initialized as the prediction error rate of an arbitrary prompt sample drawing from the prior distribution. The tolerance is decayed by one step per iteration, i.e., $$\epsilon_{t+1} = \epsilon_t - \frac{1}{N},$$

where N is the total number of training data.

Performance Metrics

For prediction performance, the prediction accuracy was evaluated on the testing dataset. For calibration performance, the expected calibration error (ECE) score is adopted as the metric. For both selective classification and OOD detection tasks, the area under the risk vs. rejection rate curve (AURRRC) is computed. The risk is defined as the portion of wrong-predicted samples among the data chosen for prediction in selective classification and the portion of OOD samples among the data identified as in-distribution in the OOD detection task. The rejection rate is defined as the portion of data that abstained from the prediction based on specific uncertainty measurement. Note that an oracle with perfect knowledge of uncertainty measurement can achieve a minimum AURRRC score. This is obtained by assigning an uncertainty score based on the oracle knowledge, i.e., whether a test sample is wrong-predicted (OOD samples) or not. Such minimum AURRRC score is denoted as the lower-bound.

Given the predictive label distribution, one or more embodiments utilize two uncertainty measurements, including Entropy of the label distribution, i.e., $\mathcal{H}(p(\tilde{y}|\tilde{x};\tilde{\mathcal{D}}))$, and MaxP, which is defined as $\max_c p(\tilde{y}=c|\tilde{x};\tilde{\mathcal{D}})$.

Results

Extensive evaluations of example embodiments were conducted under both the gradient-free setting and the gradient-free and likelihood-free setting. FIGS. 2A-2C and 3A-3B illustrate the results of experimental evaluations, in accordance with example embodiments. The results of prediction performance are shown in Table 1 of FIG. 2A. For the uncertainty quantification performance, the calibration results are shown in Table 2 of FIG. 2B, the selective classification results are shown in Table 3 of FIG. 2C, the Far OOD detection results are shown in Table 4 of FIG. 3A and the Near OOD detection results are shown in Table 5 of FIG. 3B.

Gradient-Free and Likelihood-Free Setting

No existing work is known to be trying to tackle the gradient-free and likelihood-free prompt tuning problem. However, the disclosed method is compared with other baseline methods on different problem settings to understand what can be achieved and the cost for such a more strict constraint. In addition, the results of the neural net-based approach SNPE for solving the SBI problem are also included.

As shown in Table 1 of FIG. 2A, the disclosed method ABC-SMC can achieve competitive prediction performance as the SOTA approach of the first conventional tuning framework and even outperform the other gradient-free baselines without the requirement of the model likelihood. It was also observed that ABC-SMC performs better than SNPE. The possible explanation is that the density estimation model adopted by SNPE usually requires a large number of simulated samples to achieve good performance, which is hindered by the slow inference speed of large PLM.

For the uncertainty quantification tasks, ABC-SMC underperforms on calibration and selective classification tasks but can still achieve comparable performance on the two OOD detection tasks. The performance gap can possibly be mitigated if more samples are collected (by increasing K) for a more accurate estimation of the empirical label distribution, but the computational cost is necessary for the likelihood-free constraint.

Gradient-Free Setting

By relaxing the likelihood-free constraint, it is observed that the disclosed methods, both Gradient-free Variational Inference (denoted as ELBO in the tables of FIGS. 2A-2C and 3A-3B) and Ensembles algorithms, achieve comparable or even better prediction performance than the first conventional tuning framework and other gradient-free baselines, while outperforming the first conventional tuning framework in terms of uncertainty quantification across all the tasks. Such empirical observation justifies the effectiveness of leveraging Bayesian and Ensemble techniques to enable more reliable gradient-free prompt tuning without sacrificing the prediction performance.

Performance on Other Backbone Models

To demonstrate that example embodiments generalize well on other PLM backbone models, they are evaluated on BERTLARGE (a BERT model with 24 layers) under the both gradient-free setting and gradient-free and likelihood-free setting. Note that example methods consistently outperform the first conventional tuning framework in terms of both prediction and uncertainty quantification performance under the gradient-free setting while achieving competitive performance with a small gap under the gradient-free and likelihood-free setting.

Ablation Study of Weights in ABC-SMC

In practice, it was observed that the ABC-SMC algorithm suffers from weight degeneracy, with weights for certain particles approaching one and effectively causing the posterior to be approximated by a single particle. Although, this issue can be mitigated by designing better proposals, it was found that the heuristic of using uniform weights instead of updating the weights at each iteration of the algorithm to be far more effective. To demonstrate the efficacy, an ablation study about the sampling weights was conducted. It was found that, with uniform weights, ABC-SMC both improves prediction and uncertainty quantification for the disclosed applications.

Limitations

Approximate inference algorithms were relied on to infer the learned distributions over prompts for tuning PLMs having only API access. Since the true posterior is intractable, effectively evaluating the quality of the inferred approximate posteriors is challenging. Here, downstream metrics are used to compare different algorithms. However, such metrics conflate the quality of posterior approximation with predictive performance. Assessing the quality of approximate posteriors remains an open problem. Another limitation of the disclosed ABC-based approach is that it is more expensive than approaches that can exploit gradient information.

Algorithm 1

FIG. 4 is exemplary pseudocode for a gradient-free variational inference method, in accordance with example embodiments. In one example embodiment, a gradient-free optimizer CMA-ES is used to optimize the ELBO loss. Algorithm 1 assumes that the variational distribution $q(z;\lambda)$ is a Normal distribution. The parameter being optimized is the mean u and variance a of the normal distribution $N(\mu,\alpha)$. The output is the optimized variational distribution $q(z;\lambda^*)$ and the collection of prompt samples $$\{z_s\}_{s=1}^S,\ z_s \sim q(z;\lambda^*).$$

As illustrated in FIG. 4, the input of Algorithm 1 is the training data set, CMA-ES optimizer ES, the prior distribution, the number of candidate solutions, and a count of the total iterations. The initial collection of variational parameters is initialized. For each iteration, S prompt embedding samples are generated from the variational distribution. The ELBO loss of the j-th variational distribution is evaluated. A new collection of variational parameters solutions is requested. After completing all iterations, the optimized collection of prompt embedding samples corresponding to the max ELBO loss is output.

Algorithm 2

FIG. 5 is exemplary pseudocode for a sequential Monte-Carlo approximate Bayesian computation method, in accordance with example embodiments. In one example embodiment, the Sequential Monte Carlo Approximate Inference is adopted. Algorithm 2 generates a collection of prompts whose predictions satisfy the certain constraint, e.g., how close to ground truth, and produce a new collection of prompts that satisfy the stricter constraint, i.e., prediction is closer to the ground truth. Multiple steps are iterated and an optimal collection of prompts is output.

As illustrated in FIG. 5, the input of Algorithm 2 is the PLM, the fixed random projection matrix, the initial prompt, the training data set, the prior distribution, the initial tolerance, the distance measure function, the number of samples, and the count of total iterations. For each iteration, prompt embedding samples are generated from the prior distribution and the corresponding prediction result is obtained. The sampling probability weights are initialized.

The tolerance is decayed and the perturbation kernel variance is initialized.

A random sample is drawn and a new sample is generated. The corresponding prediction result is obtained.

The sampling probability weights are updated.

The tolerance is decayed and the perturbation kernel variance is updated. After completing all iterations, the optimized collection of prompt embedding samples and final sampling weights are output.

Given the discussion thus far, it will be appreciated that, in general terms, an exemplary method, according to an aspect of the invention, includes the operations of drawing, using at least one hardware processor, prompt embedding samples 224 from a prior distribution $p(z)=\mathcal{N}(0,\sigma\cdot I)$ and passing the prompt embedding samples 224 into a pretrained model 228 to receive a corresponding token label prediction $\hat{Y}$ 240 for a batch of text data $\tilde{X}$; accepting, using the at least one hardware processor, S prompt embedding samples $$\{z_s^{(1)}\}_{s=1}^S$$

from a distribution of a first iteration that satisfy a condition of a distance function $\rho(\hat{Y},\tilde{Y})$ being less than a tolerance $\in_1$, where $\tilde{Y}$ is a ground truth label; resampling, using the at least one hardware processor in a next iteration, embeddings from the accepted S prompt embedding samples $$\{z_s^{(t-1)}\}_{s=1}^S$$

with probability proportional to weights $w^{(t-1)}$ and perturbing the resampled embeddings via a perturbation kernel to obtain a new sample $z^{(t)} \sim \mathcal{N}(z^{(t-1)},\Sigma^{(t-1)})$; propagating, using the at least one hardware processor, the perturbed resampled embeddings through the pretrained model 228; projecting to a higher dimension than a dimension of the resampled embeddings $$\{z_s^{(t)}\}_{s=1}^S,$$

using the at least one hardware processor, the resampled embeddings, $$\{z_s^{(t)}\}_{s=1}^S$$

that satisfy a N condition of the distance function $\rho(\hat{Y},\tilde{Y})$ being less than a tolerance $\epsilon_t$, where the tolerance $\epsilon_t$ is decayed by one step per iteration; concatenating the projected resampled embeddings with an embedding of a given input; and performing inferencing by inputting the concatenated embeddings into the pretrained model 228.

For the avoidance of doubt, in one or more embodiments, the prompt embedding samples from the distribution of the first iteration that satisfy the condition of the distance function between the ground truth label and the corresponding token label prediction being less than a first tolerance are accepted.

In one example embodiment, the tolerance Et decayed by one step per iteration is defined by $$\epsilon_{t+1} = \epsilon_t - \frac{1}{N},$$

where N is a total number of training data.

In one example embodiment, accuracy is used as the distance function.

In one example embodiment, a final collection of prompt embedding samples $$\{z_s^{(T)}\}_{s=1}^S$$

form an approximation to a posterior $p(z|\tilde{\mathcal{D}})$.

In one example embodiment, the given input is a text string and the inferencing operation determines a sentiment of the text string.

In one aspect, an exemplary method, according to an aspect of the invention, includes the operations of initializing, using at least one hardware processor, an initial collection of a variational parameter $$\{\lambda_j^{(0)}\}_{j=1}^m;$$

generating, using the at least one hardware processor, S prompt embedding samples 224 from a variational distribution of prompts; evaluating, using the at least one hardware processor, an evidence lower bound loss of a j-th variational distribution; optimizing, using the at least one hardware processor, the variational parameter $$\{\lambda_j^{(0)}\}_{j=1}^m$$

using an evolution strategy based on the evidence lower bound loss to generate an optimal variational distribution; sampling optimal prompt embeddings $$\{z_s^{(1)}\}_{s=1}^S$$

from the optimal variational distribution; projecting, using the at least one hardware processor, the optimal prompt embeddings.

$$\{z_s^{(t)}\}_{s=1}^S$$

to a higher dimension than a dimension of the optimal prompt embeddings $$\{z_s^{(t)}\}_{s=1}^S;$$

concatenating the projected optimal prompt embeddings and an embedding of a given input; and performing inferencing by inputting the concatenated embeddings into the pretrained model 228.

In one aspect, a computer program product comprises one or more tangible computer-readable storage media and program instructions stored on at least one of the one or more tangible computer-readable storage media, the program instructions executable by a processor, the program instructions comprising drawing, using at least one hardware processor, prompt embedding samples 224 from a prior distribution $p(z)=\mathcal{N}(0,\sigma\cdot I)$ and passing the prompt embedding samples 224 into a pretrained model 228 to receive a corresponding token label prediction Y 240 for a batch of text data X; accepting, using the at least one hardware processor, S prompt embedding samples $$\{z_s^{(1)}\}_{s=1}^S$$

from a distribution of a first iteration that satisfy a condition of a distance function $\rho(\hat{Y},\tilde{Y})$ being less than a tolerance $\epsilon_1$, where $\tilde{Y}$ is a ground truth label; resampling, using the at least one hardware processor in a next iteration, embeddings from the accepted S prompt embedding samples $$\{z_s^{(t-1)}\}_{s=1}^S$$

with probability proportional to weights $w^{(t-1)}$ and perturbing the resampled embeddings via a perturbation kernel to obtain a new sample $z^{(t)}\sim\mathcal{N}(z^{(t-1)},\Sigma^{(t-1)})$; propagating, using the at least one hardware processor, the perturbed resampled embeddings through the pretrained model 228; projecting to a higher dimension than a dimension of the optimal prompt embeddings $$\{z_s^{(t)}\}_{s=1}^S,$$

using the at least one hardware processor, the resampled embeddings $$\{z_s^{(t)}\}_{s=1}^S$$

that satisfy a condition of the distance function $\rho(\hat{Y},\tilde{Y})$ being less than a tolerance $\epsilon_t$, where the tolerance $\epsilon_t$ is decayed by one step per iteration; concatenating the projected resampled embeddings with an embedding of a given input; and performing inferencing by inputting the concatenated embeddings into the pretrained model 228.

In one aspect, an apparatus comprises a memory and at least one processor, coupled to the memory, and operative to perform operations comprising drawing, using at least one hardware processor, prompt embedding samples 224 from a prior distribution $p(z)=\mathcal{N}(0,\sigma\cdot I)$ and passing the prompt embedding samples 224 into a pretrained model 228 to receive a corresponding token label prediction $\hat{Y}$ 240 for a batch of text data $\tilde{X}$; accepting, using the at least one hardware processor, S prompt embedding samples $$\{z_s^{(1)}\}_{s=1}^{S}$$

from a distribution of a first iteration that satisfy a condition of a distance function $\rho(\hat{Y},\tilde{Y})$ being less than a tolerance $\epsilon_1$, where $\tilde{Y}$ is a ground truth label; resampling, using the at least one hardware processor in a next iteration, embeddings from the accepted S prompt embedding samples $$\{z_s^{(t-1)}\}_{s=1}^{S}$$

with probability proportional to weights $w^{(t-1)}$ and perturbing the resampled embeddings via a perturbation kernel to obtain a new sample $z^{(t)}\sim\mathcal{N}(z^{(t-1)},\Sigma^{(t-1)})$; propagating, using the at least one hardware processor, the perturbed resampled embeddings through the pretrained model 228; projecting to a higher dimension than a dimension of the resampled embeddings $$\{z_s^{(t)}\}_{s=1}^{S},$$

using the at least one hardware processor, the resampled embeddings $$\{z_s^{(t)}\}_{s=1}^{S}$$

that satisfy a condition of the distance function $\rho(\hat{Y},\tilde{Y})$ being less than a tolerance $\epsilon_t$, where the tolerance $\epsilon_t$ is decayed by one step per iteration; concatenating the projected resampled embeddings with an embedding of a given input; and performing inferencing by inputting the concatenated embeddings into the pretrained model 228.

Figure 6:
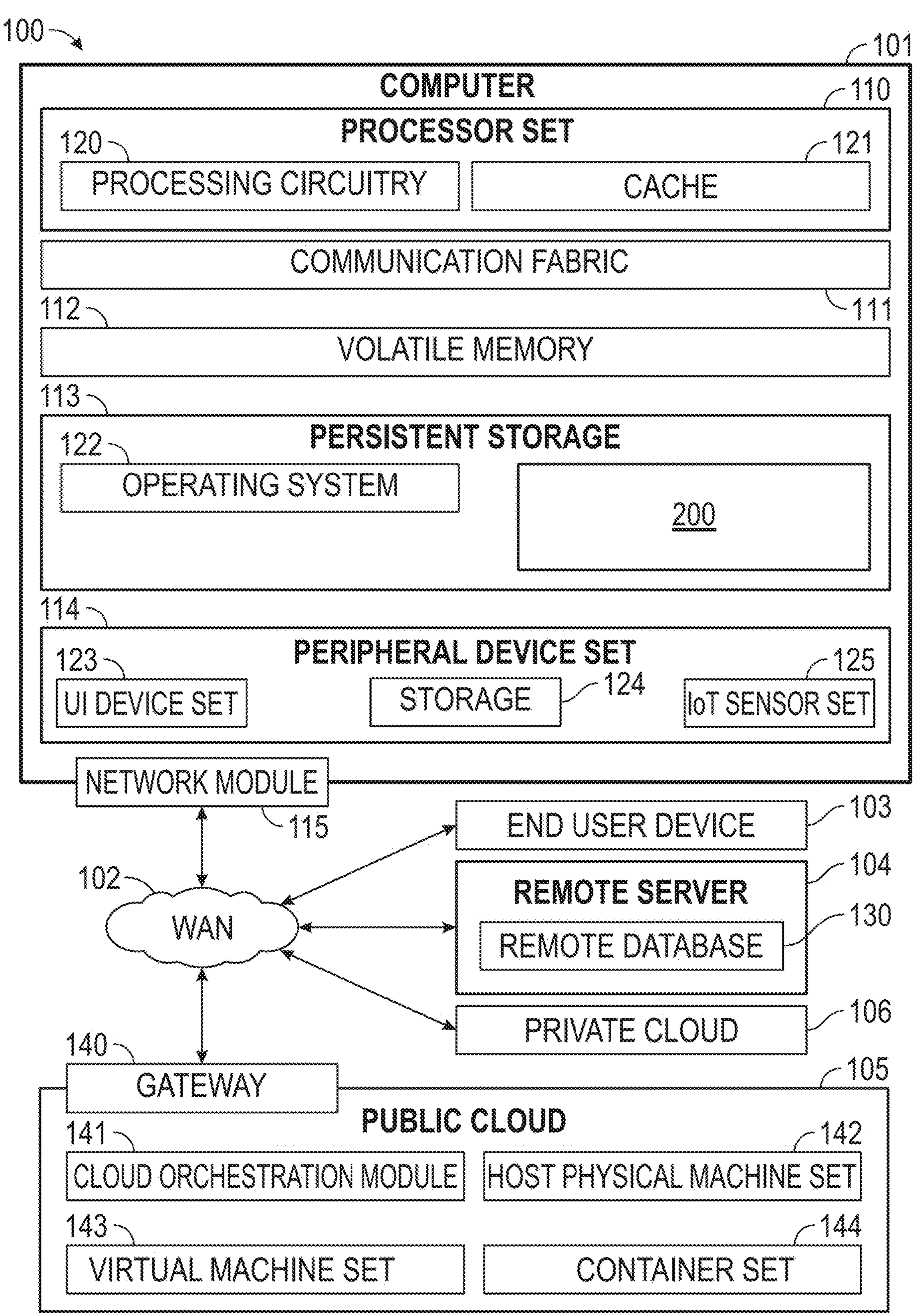
FIG. 6 depicts a computing environment according to an embodiment of the present invention.

Refer now to FIG. 6.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as system 200; for example, a machine learning system utilizing aspects of reliable gradient-free and likelihood-free prompt tuning as described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

drawing, using at least one hardware processor, prompt embedding samples from a prior distribution and passing the prompt embedding samples into a pretrained model to receive a corresponding token label prediction for a batch of text data;

accepting, using the at least one hardware processor, prompt embedding samples from a distribution of a first iteration that satisfy a condition of a distance function between a ground truth label and a corresponding token label prediction being less than a first tolerance;

resampling, using the at least one hardware processor, in a next iteration, embeddings from the accepted prompt embedding samples with probability proportional to weights and perturbing the resampled embeddings via a perturbation kernel to obtain a new sample;

propagating, using the at least one hardware processor, the perturbed resampled embeddings through the pretrained model;

projecting, to a higher dimension than a dimension of the resampled embeddings, using the at least one hardware processor, the resampled embeddings that satisfy a condition of the distance function between the ground truth label and the corresponding token label prediction being less than a second tolerance, where the second tolerance is decayed by one step per iteration;

concatenating the projected resampled embeddings with an embedding of a given input; and performing inferencing by inputting the concatenated embeddings into the pretrained model.

2. The method of claim 1, wherein a number of the prompt embedding samples is designated as S and wherein the second tolerance is decayed by one step per iteration by subtracting an inverse of a total number of training data from the second tolerance.

3. The method of claim 2, wherein accuracy is used as the distance function.

4. The method of claim 2, wherein a final collection of prompt embedding samples form an approximation to a posterior.

5. The method of claim 2, wherein the given input is a text string and the inferencing operation determines a sentiment of the text string.

6. A computer program product, comprising:

one or more tangible computer-readable storage media and program instructions stored on at least one of the one or more tangible computer-readable storage media, the program instructions executable by a processor, the program instructions comprising:

drawing, using at least one hardware processor, prompt embedding samples from a prior distribution and passing the prompt embedding samples into a pretrained model to receive a corresponding token label prediction for a batch of text data;

accepting, using the at least one hardware processor, prompt embedding samples from a distribution of a first iteration that satisfy a condition of a distance function between a ground truth label and the corresponding token label prediction being less than a first tolerance;

resampling, using the at least one hardware processor in a next iteration, embeddings from the accepted prompt embedding samples with probability proportional to weights and perturbing the resampled embeddings via a perturbation kernel to obtain a new sample;

propagating, using the at least one hardware processor, the perturbed resampled embeddings through the pretrained model;

projecting to a higher dimension than a dimension of the resampled embeddings, using the at least one hardware processor, the resampled embeddings that satisfy a condition of the distance function between the ground truth label and the corresponding token label prediction being less than a second tolerance, where the second tolerance is decayed by one step per iteration;

concatenating the projected resampled embeddings with an embedding of a given input; and performing inferencing by inputting the concatenated embeddings into the pretrained model.

7. The computer program product of claim 6, wherein a number of the prompt embedding samples is designated as S and wherein the second tolerance is decayed by one step per iteration by subtracting an inverse of a total number of training data from the second tolerance.

8. The computer program product of claim 7, wherein accuracy is used as the distance function.

9. The computer program product of claim 7, wherein a final collection of prompt embedding samples form an approximation to a posterior.

10. The computer program product of claim 7, wherein the given input is a text string and the inferencing operation determines a sentiment of the text string.

11. A system comprising:

a memory; and at least one processor, coupled to said memory, and operative to perform operations comprising:

drawing, using at least one hardware processor, prompt embedding samples from a prior distribution and passing the prompt embedding samples into a pretrained model to receive a corresponding token label prediction for a batch of text data;

accepting, using the at least one hardware processor, prompt embedding samples from a distribution of a first iteration that satisfy a condition of a distance function between a ground truth label and the corresponding token label prediction being less than a first tolerance;

resampling, using the at least one hardware processor in a next iteration, embeddings from the accepted prompt embedding samples with probability proportional to weights and perturbing the resampled embeddings via a perturbation kernel to obtain a new sample;

propagating, using the at least one hardware processor, the perturbed resampled embeddings through the pretrained model;

projecting to a higher dimension than a dimension of the resampled embeddings, using the at least one hardware processor, the resampled embeddings that satisfy a condition of the distance function between the ground truth label and the corresponding token label prediction being less than a second tolerance, where the second tolerance is decayed by one step per iteration;

concatenating the projected resampled embeddings with an embedding of a given input; and performing inferencing by inputting the concatenated embeddings into the pretrained model.

12. The system of claim 11, wherein a number of the prompt embedding samples is designated as S and wherein the second tolerance is decayed by one step per iteration by subtracting an inverse of a total number of training data from the second tolerance.

13. The system of claim 12, wherein accuracy is used as the distance function.

14. The system of claim 12, wherein a final collection of prompt embedding samples form an approximation to a posterior.

15. The system of claim 12, wherein the given input is a text string and the inferencing operation determines a sentiment of the text string.

* * * * *